US011983146B2

(12) United States Patent
Chagani et al.

(10) Patent No.: US 11,983,146 B2
(45) Date of Patent: May 14, 2024

(54) COPY-ON-WRITE UNION FILESYSTEM

(71) Applicant: Microsoft Technology Licensing, LLC, Redmond, WA (US)

(72) Inventors: Shaheed Gulamabbas Chagani, Redmond, WA (US); Christian Gregory Allred, Snohomish, WA (US); Jay Thomas Rixie, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/743,275

(22) Filed: May 12, 2022

(65) Prior Publication Data
US 2023/0367744 A1 Nov. 16, 2023

(51) Int. Cl.
  *G06F 7/00* (2006.01)
  *G06F 16/16* (2019.01)
  *G06F 16/172* (2019.01)
  *G06F 16/18* (2019.01)

(52) U.S. Cl.
  CPC .......... *G06F 16/172* (2019.01); *G06F 16/162* (2019.01); *G06F 16/166* (2019.01); *G06F 16/18* (2019.01)

(58) Field of Classification Search
  CPC .... G06F 16/172; G06F 16/162; G06F 16/166; G06F 16/18
  See application file for complete search history.

(56) References Cited

U.S. PATENT DOCUMENTS

| | | | |
|---|---|---|---|
| 7,197,516 B1* | 3/2007 | Hipp | G06F 16/10 |
| 8,271,558 B1* | 9/2012 | Caklovic | G06F 16/192 |
| | | | 707/828 |
| 10,140,461 B2 | 11/2018 | Christiansen et al. | |
| 2008/0005133 A1* | 1/2008 | Khalidi | G06F 16/192 |
| 2008/0109394 A1* | 5/2008 | Havens | G06F 16/162 |
| 2008/0109466 A1* | 5/2008 | Havens | G06F 9/45537 |
| | | | 707/999.102 |

(Continued)

OTHER PUBLICATIONS

Kappes, et al., "Experience Paper: Danaus: Isolation and Efficiency of Container I/O at the Client Side of Network Storage", In Proceedings of the 22nd International Middleware Conference, Dec. 6, 2021, pp. 132-145.

(Continued)

*Primary Examiner* — Mohammed R Uddin
(74) *Attorney, Agent, or Firm* — Workman Nydegger

(57) ABSTRACT

A copy-on-write union filesystem. A computer system identifies a first filesystem namespace as a mutable layer, and a second filesystem namespace as an immutable layer. The computer system exposes a merged filesystem namespace as a union filesystem that merges the mutable layer and the immutable layer, and that overlays the first filesystem namespace over the second filesystem namespace. The computer system identifies an operation on the merged filesystem namespace that requests to read from a file within the merged filesystem namespace, the file being stored in the second filesystem namespace and not being stored in the first filesystem namespace. The computer system returns a handle referencing a proxy object stored in a system memory. The proxy object includes a mapping to a file object corresponding to the file as stored in the second filesystem namespace.

20 Claims, 4 Drawing Sheets

(56) References Cited

U.S. PATENT DOCUMENTS

| | | | | |
|---|---|---|---|---|
| 2010/0229169 | A1* | 9/2010 | Bunnell | G06F 9/455 |
| | | | | 718/1 |
| 2010/0257218 | A1* | 10/2010 | Vassilev | G06F 16/188 |
| | | | | 707/823 |
| 2011/0231370 | A1* | 9/2011 | Aurora | G06F 16/188 |
| | | | | 707/831 |
| 2014/0173135 | A1* | 6/2014 | Varney | H04L 47/83 |
| | | | | 709/245 |
| 2015/0378849 | A1* | 12/2015 | Liu | G06F 16/188 |
| | | | | 711/162 |
| 2016/0170773 | A1* | 6/2016 | Franck | G06F 9/4406 |
| | | | | 713/2 |
| 2017/0374151 | A1* | 12/2017 | Moorthi | H04L 67/1097 |
| 2018/0129666 | A1 | 5/2018 | Havewala et al. | |
| 2018/0129821 | A1* | 5/2018 | Havewala | G06F 3/0664 |
| 2020/0004962 | A1* | 1/2020 | Araujo | G06F 21/568 |
| 2020/0004977 | A1* | 1/2020 | Araujo | G06F 16/1734 |
| 2020/0242075 | A1* | 7/2020 | Davis | G06F 16/178 |
| 2021/0342484 | A1* | 11/2021 | Creti | G06F 21/554 |

OTHER PUBLICATIONS

"International Search Report and Written Opinion Issued in PCT Application No. PCT/US23/013375", dated Jun. 15, 2023, 11 Pages.

"PFLT_GENERATE_FILE_NAME callback function (fltkernel.h)", Retrieved from: https://docs.microsoft.com/en-us/windows-hardware/drivers/ddi/fltkernel/nc-fltkernel-pflt_generate_file_name, Oct. 22, 2021, 5 Pages.

"PFLT_NORMALIZE_NAME_COMPONENT_EX callback function (fltkemel.h)", Retrieved from: https://docs.microsoft.com/en-us/windows-hardware/drivers/ddi/fltkernel/nc-fltkernel-pflt_normalize_name_component_ex, Oct. 22, 2021, 5 Pages.

"FltGetFileNameInformation function (fltkernel.h)", Retrieved from: https://docs.microsoft.com/en-us/windows-hardware/drivers/ddi/fltkernel/nf-fltkernel-fltgetfilenameinformation, Oct. 27, 2021, 7 Pages.

* cited by examiner

COPY-ON-WRITE UNION FILESYSTEM

BACKGROUND

A computing host can implement separate containers to execute separate run-time environments, where each run-time environment includes one or more processes. A container relies upon access to files (e.g., executables, binaries, etc.) to execute the processes contained in the container. Typically, a container has its own container namespace on a storage resource to which files can initially be loaded. After the files are loaded, the container can open the files from its own container namespace and access the file data in the opened files to execute the processes. Frequently, computing hosts implement a plurality of containers that access a common set of files, such as files implementing a run-time environment that is used in common between those containers.

In order to conserve storage resources in environments—such as container environments—in which multiple consumers need to access a common set of files, techniques such as those implemented by Windows Container Isolation Filesystem Filter Driver (wcifs) from MICROSOFT CORPORATION have been developed to merge one or more read-only filesystem namespaces (read-only layer(s), e.g., storing files implementing a run-time environment) with a writable filesystem namespace that is unique to a consumer (scratch layer), forming a merged writable filesystem from that consumer's perspective. Using these techniques, when a consumer first opens a file for any reason within the merged writable filesystem, a placeholder file (e.g., an empty file with only metadata) is created in that consumer's scratch layer.

While these techniques do conserve storage resources, they also make many file operations slow, because the mere act of a consumer opening a file for reading requires creation of a file in that consumer's scratch layer. This can severely impact performance of the consumer, particularly in cases in which the consumer quickly opens a large number of files. For example, when a container starts up it may open thousands of files in order to load its run-time environment, and creation of a placeholder file for each of these thousands of files can make container startup unacceptably slow.

BRIEF SUMMARY

At least some embodiments herein are directed to a copy-on-write union filesystem, which eliminates the use of placeholder files in a consumer's scratch layer, while still providing a merge of one or more read-only layers with a modifiable scratch. These embodiments thus eliminate the impact of creating a placeholder file when opening a file for reading.

In some aspects, the techniques described herein relate to a computer-implemented method for providing a copy-on-write union filesystem, the computer-implemented method including: identifying a first filesystem namespace as a mutable layer; identifying a second filesystem namespace as an immutable layer; exposing a merged filesystem namespace as a union filesystem that merges the mutable layer and the immutable layer, the union filesystem overlaying the first filesystem namespace over the second filesystem namespace, wherein for each overlapping file that overlaps between the first filesystem namespace and the second filesystem namespace, the merged filesystem namespace includes an instance of the file as stored in the first filesystem namespace; identifying a first operation on the merged filesystem namespace that requests to read from a first file within the merged filesystem namespace, the first file being stored in the second filesystem namespace and not being stored in the first filesystem namespace; and returning a first handle referencing a proxy object stored in a system memory, the proxy object including a mapping to a first file object corresponding to the first file as stored in the second filesystem namespace.

In some aspects, the techniques described herein relate to a computer system for providing a copy-on-write union filesystem, including: a processor; a memory; and a computer storage media that stores computer-executable instructions that are executable by the processor to cause the computer system to at least: identify a first filesystem namespace as a mutable layer; identify a second filesystem namespace as an immutable layer; expose a merged filesystem namespace as a union filesystem that merges the mutable layer and the immutable layer, the union filesystem overlaying the first filesystem namespace over the second filesystem namespace, wherein for each file that overlaps between the first filesystem namespace and the second filesystem namespace, the merged filesystem namespace includes an instance of the file as stored in the first filesystem namespace; identify a first operation on the merged filesystem namespace that requests to read from a first file within the merged filesystem namespace, the first file being stored in the second filesystem namespace and not being stored in the first filesystem namespace; and return a first handle referencing a proxy object stored in the memory, the proxy object including a mapping to a first file object corresponding to the first file as stored in the second filesystem namespace.

In some aspects, the techniques described herein relate to a computer program product including a computer storage media that stores computer-executable instructions that are executable by a processor to cause a computer system to provide a copy-on-write union filesystem, the computer-executable instructions including instructions that are executable by the processor to cause the computer system to at least: identify a first filesystem namespace as a mutable layer; identify a second filesystem namespace as an immutable layer; expose a merged filesystem namespace as a union filesystem that merges the mutable layer and the immutable layer, the union filesystem overlaying the first filesystem namespace over the second filesystem namespace, wherein for each file that overlaps between the first filesystem namespace and the second filesystem namespace, the merged filesystem namespace includes an instance of the file as stored in the first filesystem namespace; identify a first operation on the merged filesystem namespace that requests to read from a first file within the merged filesystem namespace, the first file being stored in the second filesystem namespace and not being stored in the first filesystem namespace; and return a first handle referencing a proxy object stored in a memory of the computer system, the proxy object including a mapping to a first file object corresponding to the first file as stored in the second filesystem namespace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

At least some embodiments herein are directed to a copy-on-write (COW) union filesystem, which eliminates the use of placeholder files in a consumer's scratch layer, while still providing a merge of one or more read-only layers with a modifiable scratch. These embodiments thus eliminate the impact of creating a placeholder file when opening a file for reading, which can significantly improve filesystem performance.

Figure 1:
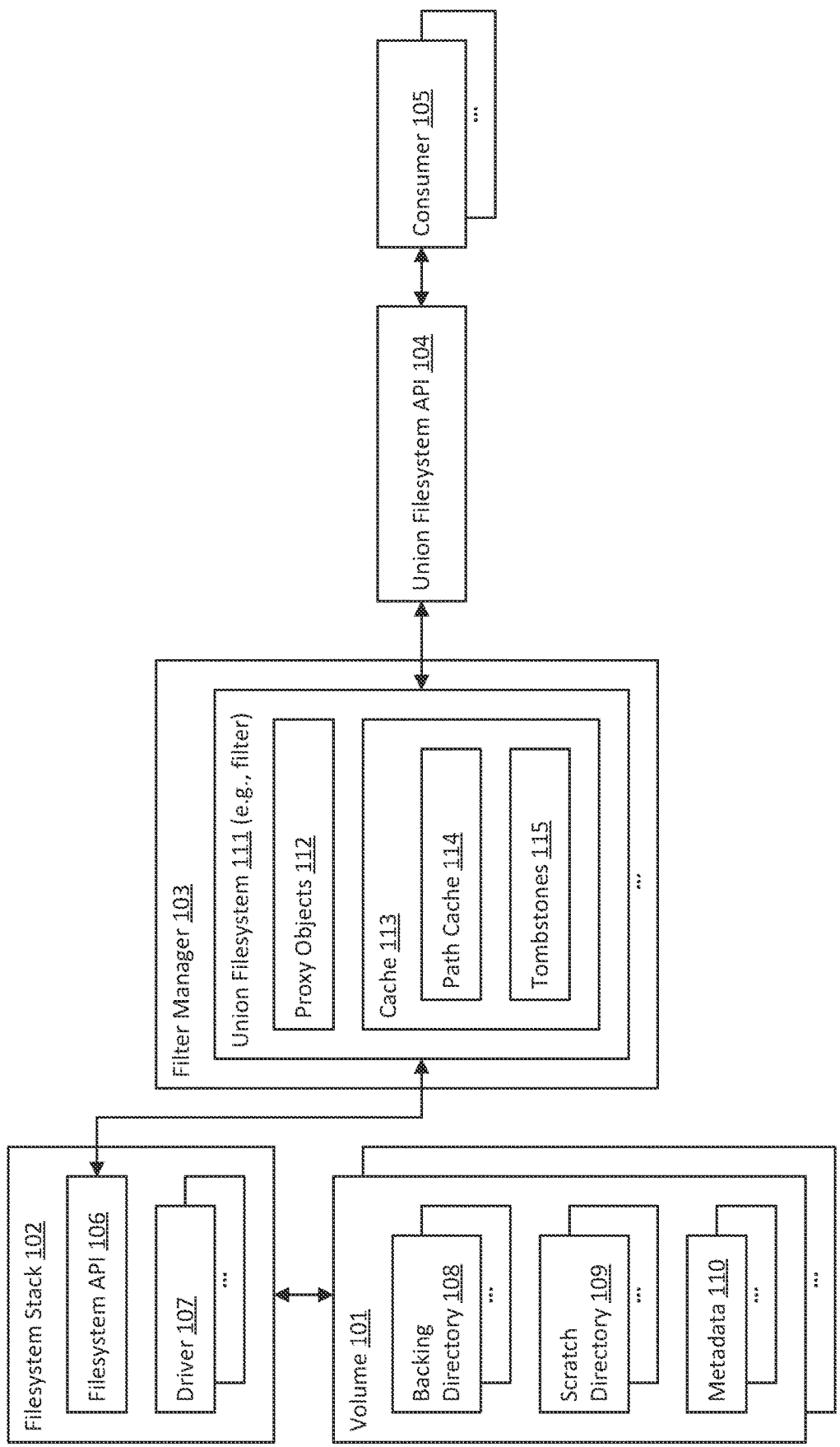
FIG. 1 illustrates an example computer architecture that facilitates providing a copy-on-write union filesystem.

FIG. 1 illustrates an example computing environment 100 that facilitates providing a COW union filesystem. Copy-on-write (COW) refers to a strategy in which, when data (e.g., a file) is modified, those modifications are made to a copy of the data rather than to the original data. A union filesystem allows files and directories of multiple, separate filesystems to be overlaid to provide a single merged filesystem view. As shown, computing environment 100 includes a volume 101 (or a plurality of volumes) stored on one or more computer storage media. Computing environment 100 also includes a filesystem stack 102 for interfacing with volume(s) 101, and which includes a driver 107 (or drivers) corresponding to the filesystem type(s) used by the volume(s) 101. Additionally, filesystem stack 102 comprises a filesystem application programming interface (API) 106. In embodiments, the filesystem stack 102 is an operating system (OS) driver or module, and the filesystem API 106 enables other OS components to interact with the filesystem stack 102.

As shown, computing environment 100 includes a union filesystem component 111. In embodiments, the union filesystem component 111 constructs a union of multiple directories, potentially on different volumes of volume(s) 101, and presents those multiple directories to a consumer 105 (or a plurality of consumers) as though they were a single unified file tree. In embodiments, the union filesystem component 111 operates within kernel mode of the OS. Thus, computing environment 100 is shown as also including a union filesystem API 104, which in embodiments operates in within user mode of the OS, and which enables consumer(s) 105 operating in user mode to interface with the union filesystem component 111 in kernel mode. As shown, in some implementations, the union filesystem component 111 is a filesystem filter, implemented as one of potentially a plurality of filesystem filters provided by a filter manager 103. Implementing the union filesystem component 111 as a filesystem filter enables the union filesystem component 111 to operate via the filesystem API 106, without specific knowledge of the filesystem(s) used by the volume(s) 101. However, it will be appreciated that the union filesystem component 111 could be implemented in a variety of different manners, such as a standalone driver or module, as a filesystem driver, as a subcomponent of the filesystem stack 102, as a user-mode component, and the like.

Figure 2:
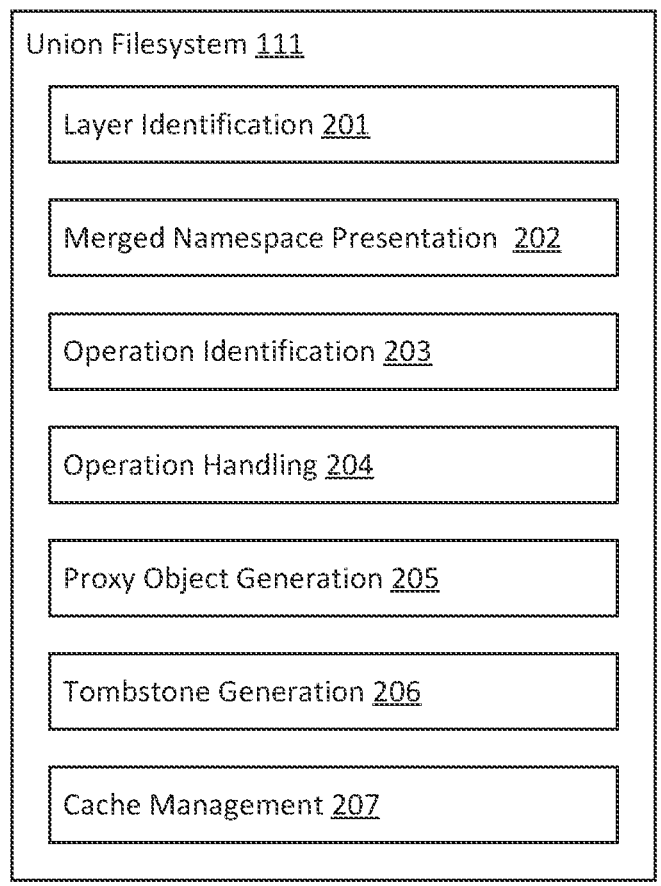
FIG. 2 illustrates an example of internal components of a union filesystem component (e.g., filesystem filter).

FIG. 2 illustrates an example 200 of internal components of the union filesystem component 111 of FIG. 1. As shown, in example 200, the union filesystem component 111 includes a layer identification component 201, a merged namespace presentation component 202, an operation identification component 203, an operation handling component 204, a proxy object generation component 205, a tombstone generation component 206, and a cache management component 207. Each internal component of the union filesystem component 111 depicted in FIG. 2 represents various functionalities that the union filesystem component 111 might implement in accordance with various embodiments described herein. It will be appreciated, however, that the depicted components—including their identity and arrangement—are presented merely as an aid in describing example embodiments of the union filesystem component 111.

In embodiments, the layer identification component 201 identifies directories to be used as backing and scratch layers in a union filesystem. As shown, volume(s) 101 store a backing directory 108 (or a plurality of backing directories), any of which can be used by the layer identification component 201 as the basis for an immutable layer of a union filesystem. In embodiments, if there are a plurality of backing directories 108 and a plurality of volumes 101, those backing directories 108 are at least partially distributed across one or more of those volumes 101. In computing environment 100, each backing directory 108 stores objects (e.g., a hierarchy of files and directories) that are to be shared as immutable objects to one or more consumers of consumer(s) 105. In some embodiments, one or more consumers of consumer(s) 105 is a container.

As shown, the volume(s) 101 also store a scratch directory 109 (or a plurality of scratch directories), each of which is used as a mutable layer for a different union filesystem (e.g., each for a different consumer of consumer(s) 105). In embodiments, if there are a plurality of scratch directories 109 and a plurality of volumes 101, those scratch directories 109 are at least partially distributed across one or more of those volume(s) 101. In computing environment 100, each scratch directory 109 stores objects (e.g., a hierarchy of files and directories) that have been created on, or modified on, a union filesystem (e.g., based on a request by consumer 105).

In embodiments, when constructing a union of multiple directories, the layer identification component 201 assigns (e.g., based on a user-provided configuration) each directory a unique priority, with a higher-priority directory being logically layered "above" a lower-priority directory. Each backing directory 108 that is configured as part of the union comprises an immutable (e.g., read-only) backing layer, while the scratch directory 109 for the union comprises a highest-priority mutable (e.g., readable and writable) scratch layer.

In embodiments, the contents of a given backing layer overlay the contents of all lower-priority backing layers, and the scratch layer overlays all backing layers. Given this arrangement, in embodiments, the merged namespace presentation component 202 exposes the contents of the scratch layer and the backing layers as a merged filesystem namespace (e.g., when all, or a portion of, the union filesystem is enumerated).

In embodiments, if two or more layers comprise a file with the same path and name, the file on the higher-priority layer "shadows" the one on the lower-priority layer, such that the lower-priority layer's file is hidden in the merged filesystem namespace.

In embodiments, the various layers are presented as a single merged directory hierarchy starting at the root of the scratch layer, with the root of each backing layer merged with the root of the scratch layer. For example, if a union consists of a scratch directory "c:\scratch", a backing directory "c:\layer1", and a backing directory "d:\foo\bar\layer2", then enumerating in c:\scratch will present a merger of the contents of c:\scratch, c:\layer1, and d:\foo\bar\layer2. In embodiments, layers are not allowed to be nested. For example, if c:\foo is a layer root, then c:\foo\bar cannot also be a layer root.

Figure 3:
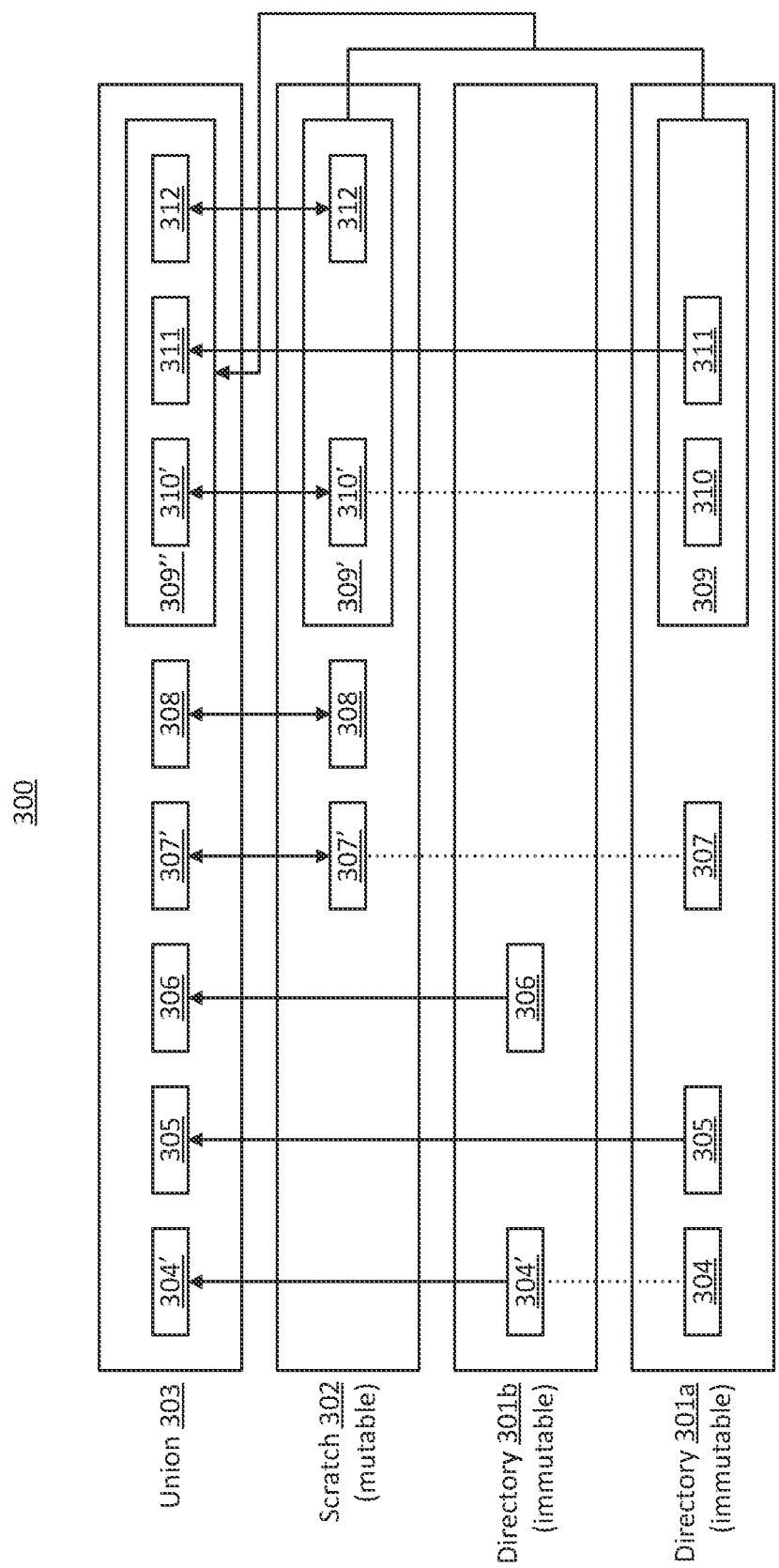
FIG. 3 illustrates an example of constructing a union of multiple directories.

FIG. 3 illustrates an example 300 of constructing a union of multiple directories. In example 300 the layer identification component 201 has identified two backing directories as backing layers—directory 301a and directory 301b. These backing layers are indicated in FIG. 3 as being immutable. In other examples, there could be a single backing directory/layer (e.g., directory 301a), or more than two backing directories/layers. Additionally, the layer identification component 201 has identified a scratch directory, scratch 302, as a scratch layer. This scratch layer is indicated in FIG. 3 as being mutable. In example 300, layer identification component 201 has arranged these layers such that directory 301a has a lowest priority, scratch 302 has a highest priority, and directory 301b has an intermediate priority between that of directory 301a and scratch 302.

A shown in example 300, the merged namespace presentation component 202 exposes a union filesystem made up by these three directories as a union 303. In example 300 this union 303 comprises object 304', object 305, object 306, object 307', object 308, object 310', object 311, and object 312 (e.g., all files), and a directory 309". As shown by solid arrows, object 304' originates from directory 301b (shadowing object 304 within directory 301a, as indicated by a broken line), object 305 originates from directory 301a, object 306 originates from directory 301b, object 307' originates from the scratch 302 (shadowing object 307 in directory 301a, as indicated by a broken line), and object 308 originates from the scratch 302. Additionally, directory 309" comprises a merger of directory 309' within the scratch 302 and directory 309 within directory 301a, and includes object 310' from directory 309' within the scratch 302 (shadowing object 310 in directory 309 within directory 301a, as indicated by a broken line), object 311 from directory 309, and object 312 from directory 309' within the scratch 302.

As demonstrated in example 300, the merged namespace presentation component 202 presents a union of a modifiable scratch area (e.g., scratch 302) with read-only backing layers (e.g., directory 301a and directory 301b). However, this is transparent to the consumer 105, which expects to be able to modify any file it has access to. In embodiments, to support apparent modification of an immutable layer, the union filesystem component 111 employs a COW strategy for capturing consumer modifications to a union filesystem. In embodiments, the union filesystem component 111 creates new files or directories in the scratch directory 109 (e.g., object 308 and object 312 in example 300). If the consumer modifies the contents of a file in a backing layer, the union filesystem component 111 first copies that file to the scratch layer (e.g., object 307' and 310' in example 300), and then allows the modification to the copy. In example 300, double ended arrows connecting objects in the union 303 and objects in the scratch 302 indicate the mutability of the objects in the scratch 302. Thus, the scratch directory 109 contains files that are new, files that have been modified, and directory path components necessary to link files to a volume root. Notably, unlike prior techniques, scratch directory 109 does not contain placeholders for unmodified files. For example, in example 300, the scratch 302 does not store any data for object 305, object 306, and object 311.

In embodiments, the operation identification component 203 identifies operations on a union filesystem exposed by the merged namespace presentation component 202, and an operation handling component 204 processes those operations. In embodiments, the operation identification component 203 identifies an operation comprising a call by a consumer 105 to open a file that can be satisfied on the scratch layer (e.g., scratch directory 109), as would be the case when opening any of object 307', 308, or 312 in example 300. In these embodiments, the operation handling component 204 allows the file system on which the scratch layer resides to process the call; thus, a handle returned to the consumer 105 is backed by a file object owned by the file system on which the scratch layer resides, and the consumer 105 can use this handle both for reads and writes. For example, if consumer 105 issues a call to open any of object 307', object 308, object 310', or object 312, then the union filesystem component 111 returns to consumer 105 a handle referencing an appropriate file object owned by the filesystem backing the scratch 302.

In embodiments, the operation identification component 203 identifies an operation comprising a call by a consumer 105 to open a file that can only be satisfied by an item on a backing layer (e.g., backing directory 108), as would be the case when opening any of object 304', 305, 306, or 311 in example 300. In these embodiments, the operation handling component 204 initiates a new call on a filesystem on which the that backing layer resides, resulting in the operation handling component 204 obtaining a handle referencing a backing file object owned by the file system on which the backing layer resides. In these embodiments, the proxy object generation component 205 then creates a proxy object, and stores this the proxy object in system memory (proxy objects 112) without persisting that proxy object to volume 101. The proxy object is an object that at least references the backing file object. The operation handling component 204 then returns a handle referencing this proxy object to the consumer 105, and the consumer 105 can use this handle for reads. Thus, through use of proxy objects, the union filesystem component 111 has avoided writing any data to the scratch directory 109 when opening a file from the backing layer, which prevents the file open performance penalties present in prior filesystem merging techniques. For example, if consumer 105 issues a call to open any of object 304', object 305, object 306, or object 311 for reading, then the operation handling component 204 returns to consumer 105 a handle referencing an in-memory proxy object (proxy objects 112), which in turn references a backing file object owned by the filesystem corresponding to the appropriate backing directory (e.g., directory 301a or directory 301b, depending on which layer the requested object resides on).

In embodiments, when the operation identification component 203 identifies an operation comprising a write using a handle referencing a proxy object, the operation handling component 204 uses COW techniques to create the corresponding file in the scratch layer (including creating any intermediate path components), copies the file's data and metadata from the backing layer to the new file in the scratch, and updates the handle so that it references a file object corresponding to the newly-created file in the scratch layer, rather than the proxy object. In example 300, for instance, consumer 105 has previously issued a call to open object 307 (or object 310) for reading, resulting in the operation handling component 204 returning to consumer 105 a handle referencing a proxy object referencing a backing file object in a filesystem corresponding to directory 301a corresponding to object 307 (or object 310). Then, based on the consumer 105 issuing a write to object 307 (or object 310) using that handle, the operation handling component 204 copies object 307 (or object 310) to the scratch 302 as object 307' (or object 310'), and updates the consumer's handle so that it references a file object corresponding to object 307' (or object 310') that is owned by the filesystem backing the scratch 302.

In embodiments the cache management component 207 maintains a cache 113, which in some embodiments comprises a path cache 114. In embodiments, to mitigate file open amplification when the same file is opened repeatedly, the cache management component 207 caches the handles that have been opened to files within backing layers (i.e., handles referencing backing file objects). When a caller opens a file on a union filesystem, the operation handling component 204 will need to find where the file resides, either on the scratch layer or in a backing layer. When files are on a backing layer, opening a file would require at least two opening operations. Thus, to avoid multiple operations for files that have been opened recently, in embodiments, the cache management component 207 uses the path cache 114 to store cached information pertaining to previously-opened files that were opened from a backing layer. In embodiments, the path cache 114 does not record entries for files that are open from the scratch layer. In embodiments, the path cache 114 is indexed by caller path, and each cache entry comprises one or more of a reference to a backing layer context, a layer path, a handle referencing a backing file, or a backing file object.

In embodiments, the path cache 114 may store additional security information with each entry, such as a cached security descriptor for the backing file, a table of user identities who have passed a traverse check to the file, and the like. In these embodiments, this security information is utilized when opening an item using the path cache 114. In embodiments, when the cache management component 207 adds an entry to the path cache 114 it sets an accessed bit for the entry and initializes an entry age to zero, and uses these accessed bits and entry ages to invalidate entries from the path cache 114 later.

In embodiments, when a consumer 105 opens a file that resides on a backing layer, the operation handling component 204 first consults the path cache 114. If an entry for the file is not there, then the operation handling component 204 does a traverse access check on the backing layer file, and if that passes the operation handling component 204 creates a handle referencing the backing layer file. The cache management component 207 then creates a cache entry for the file, and the proxy object generation component 205 creates a proxy object for the consumer 105. In embodiments, if the item being opened is already in the path cache 114, the proxy object generation component 205 creates a proxy object for the caller using the cached information (e.g., a cached handle and a cached backing file object).

In embodiments, the tombstone generation component 206 creates tombstones 115 in the cache 113. A tombstone is a metadata indicating an attribute—such as deleted, renamed, or replaced—of an underlying data. In embodiments, when an object that exists in a backing layer is deleted, renamed, or replaced, the tombstone generation component 206 generates a tombstone in system memory to remember that the object was deleted, renamed, or replaced. In some embodiments, each tombstone 115 is stored as a payload of an entry in the path cache 114. In embodiments, the tombstones 115 include a delete tombstone that indicates that a file or directory in a backing layer was deleted; in embodiments, when a delete tombstone is stored as payload of an entry in the path cache it is a flag that indicates if a corresponding object has been deleted or not. In embodiments, the tombstones 115 include a renamed tombstone that indicates that a directory in a backing layer has been renamed; in embodiments, when a renamed tombstone is stored as payload of an entry in the path cache it indicates a prior name of the corresponding directory. In embodiments, the tombstones 115 include a replaced tombstone that indicates that a directory in a backing layer has been replaced with a directory in a scratch layer; in embodiments, when a replaced tombstone is stored as payload of an entry in the path cache it indicates an identity of a replacement directory for the corresponding directory.

As shown, volume(s) 101 also stores a set of metadata 110 (or a plurality of sets of metadata), each of which is used to store persisted metadata for a different union filesystem. In embodiments, if there are a plurality of sets of metadata 110 and a plurality of volumes 101, those sets of metadata 110 are at least partially distributed across one or more of those volumes 101. In an embodiment, the set of metadata 110 for a given union filesystem is stored on the same volume as that union filesystem's corresponding scratch directory 109. In embodiments, the union filesystem component 111 periodically persists these tombstones 115 to volume 101 as the set of metadata 110, in order to guard against crash or power loss. Thus, when a union is restarted, these persisted tombstones are restored to the cache 113.

In embodiments, when the operation identification component 203 identifies an operation comprising a request to enumerate a directory on merged union namespace, the operation handling component 204 requests a directory object from each layer comprising a directory having that same name and path. The directory objects specify, among other things, the file object(s) that are contained therein. Then, using the priorities assigned to the layers from which those directory objects originate, the operation handling component 204 generates a directory object comprising a merger of the underlying directory objects. For example, in example 300, the operation handling component 204 merges a first directory object corresponding to directory 309 and a second directory object corresponding to directory 309' in order to generate a directory object representing directory 309". As shown, directory 309" includes object 310' from the scratch 302 (shadowing object 310) from directory 301a, object 311 from directory 301a, and object 312 from the scratch 302.

In embodiments, as part of processing an enumeration operation, the operation handling component 204 also identifies any relevant tombstones 115. Using delete tombstones, the operation handling component 204 suppresses deleted files from the enumeration. Using rename tombstones, the operation handling component 204 presents at least a portion of contents of directory from a backing layer using renamed name. Using replaced tombstones, the operation handling component 204 presents a directory from the scratch 302 without merging that directory with a directory having the same name in a backing layer.

Figure 4:
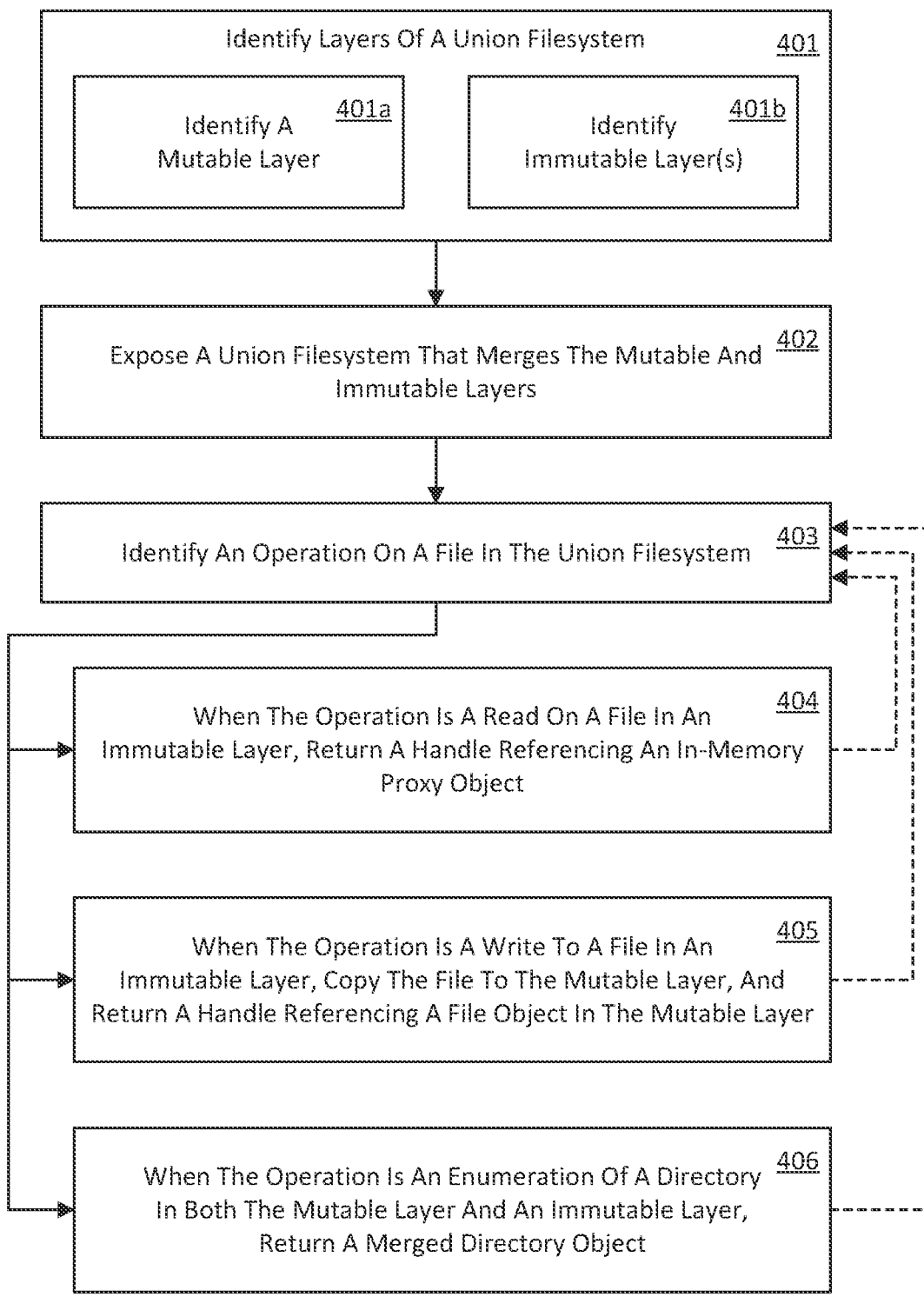
FIG. 4 illustrates a flow chart of an example method for providing a copy-on-write union filesystem.

Operation of the union filesystem component 111 is now described in connection with FIG. 4, which illustrates a flow chart of an example method 400 for providing a COW union filesystem. In embodiments, method 400 is a computer-implemented method, and is encoded as computer-executable instructions (e.g., computer-executable instructions implementing union filesystem component 111) stored on a computer storage media that are executable by a processor to cause a computer system to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

As shown, method 400 comprises an act 401 of identifying layers of a union filesystem. As shown, act 401 includes an act 401a of identifying a mutable layer, and an act 401b of identifying immutable layer(s). As shown in FIG. 4, there is no ordering required between act 401a and act 401b. In some embodiments, act 401a comprises identifying a first filesystem namespace as a mutable layer. In an example of act 401a, the layer identification component 201 identifies scratch directory 109 as a mutable scratch layer (scratch 302). In some embodiments, act 401b comprises identifying a second filesystem namespace as an immutable layer. In an example of act 401b, the layer identification component 201 identifies directory 301a (e.g., one of backing directories 108) as an immutable backing layer. As noted, there can be multiple immutable backing layers, such as one corresponding to directory 301b. Thus, in some embodiments, act 401b also comprises identifying a third filesystem namespace as an additional immutable layer. An effect of act 401 is to identify multiple directories that will be layered together to form a union filesystem.

Method 400 also comprises an act 402 of exposing a union filesystem that merges the mutable and immutable layers. In some embodiments, act 402 comprises exposing a merged filesystem namespace as a union filesystem that merges the mutable layer and the immutable layer. In these embodiments, the union filesystem overlays the first filesystem namespace over the second filesystem namespace, and for each overlapping file that overlaps between the first filesystem namespace and the second filesystem namespace, the merged filesystem namespace comprises an instance of the file as stored in the first filesystem namespace. In an example, in which act 401b identifies only directory 301a, the merged namespace presentation component 202 presents a union of directory 301a and scratch 302 (e.g., by enumerating object 304, object 305, object 307', object 308, and directory 309" (comprising object 310', object 311, and object 312). An effect of act 402 is to provide a consumer a virtual view of multiple directories in a layered and merged manner.

Additional embodiments of act 402 could include merging one or more additional backing directories. For example, in embodiments in which act 401b comprises identifying a third filesystem namespace as an additional immutable layer, in act 402 the union filesystem merges the mutable layer, the immutable layer, and the additional immutable layer. In these embodiments, the union filesystem overlays the first filesystem namespace over the second filesystem namespace, and overlays the second filesystem namespace over the third filesystem namespace, and for each file that overlaps between the second filesystem namespace and the third filesystem namespace and that does not exist in the first filesystem namespace, the merged filesystem namespace comprises an instance of the file as stored in the second filesystem namespace. In an example, in which act 401b identifies both directory 301a and directory 301b, the merged namespace presentation component 202 presents a union of directory 301a, directory 301b, and scratch 302 (e.g., by enumerating object 304', object 305, object 306, object 307', object 308, and directory 309" (comprising object 310', object 311, and object 312).

Method 400 also comprises an act 403 of identifying an operation on a file in the union filesystem. In some embodiments, act 403 comprises identifying an operation on the merged filesystem namespace. As examples, the operation identification component 203 identifies an open (read) operation, a write operation, a directory enumeration operation, and the like. As shown, depending on a type of the operation identified in act 403, method 400 includes at least one of: an act 404 (e.g., when the type of the operation is a read), an act 405 (e.g., when the type of the operation is a write), or an act 406 (e.g., when the type of the operation is an enumerate). Notably, act 404, act 405, an act 406 are examples only, and other types of operations (and corresponding acts), such as delete operations and rename operations, are possible. As shown, after act 404, act 405, or act 406, method 400 may return to act 403, in order to detect a subsequent operation on a file in the union filesystem.

In embodiments, the operation identified in act 403 requests to read from a file within the merged filesystem namespace, and file is stored in the second filesystem namespace (an immutable layer) and is not stored in the first filesystem namespace (a mutable layer). Thus, method 400 proceeds to an act 404 of, when the operation is a read on a file in an immutable layer, returning a handle referencing an in-memory proxy object. In some embodiments, act 404 comprises, based at least on the operation requesting to read from the file, and on the file being stored in the second filesystem namespace and not being stored in the first filesystem namespace, returning a handle referencing a proxy object stored in a system memory, the proxy object including a mapping to a file object corresponding to the file as stored in the second filesystem namespace. In an example, the operation identification component 203 identifies an operation to open object 305 for reading. Because this object exists in directory 301a and not in the scratch 302, the operation handling component 204 issues an open on object 305 within a filesystem on which directory 301a resides, in order to obtain a handle referencing a backing file object on that filesystem, and then the proxy object generation component 205 generates an in-memory proxy object that references this backing file object. The operation handling component 204 then returns a handle referencing the proxy object to the caller. An effect of act 404 is to enable a file from a backing layer to be opened for reading without creating any placeholder file on the volume(s) 101, thereby avoiding the overheads of doing so and improving filesystem performance.

As mentioned, when returning handles to proxy objects to callers, the union filesystem component 111 maintains (using the cache management component 207) a path cache 114 comprising handles to corresponding backing objects. Thus, in some embodiments method 400, act 404 also comprises storing a second handle referencing the file object within a cache stored in the system memory, the second handle being associated, in the cache, with a path to the file.

In embodiments, the operation identified in act 403 requests to write to a file within the merged filesystem namespace, and file is stored in the second filesystem namespace (an immutable layer) and is not stored in the first filesystem namespace (a mutable layer). Thus, method 400 proceeds to an act 405 of, when the operation is a write to a file in an immutable layer, copying the file to the mutable layer, and returning a handle referencing a file object in the mutable layer. In some embodiments, act 405 comprises, based at least the operation requesting to write to the file, and on the file being stored in the second filesystem namespace and not being stored in the first filesystem namespace, storing a copy of the second file in the first filesystem namespace; and returning a handle referencing a file object corresponding to the copy of the file as stored in the first filesystem namespace. In an example, the operation identification component 203 identifies an operation to write to object 305. Since this object exists in directory 301*a* and not in the scratch 302, the operation handling component 204 copies that object to the scratch 302 and then returns a handle referencing the copy to the caller. In embodiments, returning the handle referencing the copy to the caller comprises updating a handle used by the caller to reference the object in the scratch layer (e.g., rather than referencing a proxy object). An effect of act 405 includes enabling a caller to persist a write to a file that resides on a mutable layer, without affecting the data stored on that mutable layer.

In embodiments, the operation identified in act 403 requests to enumerate a directory within the merged filesystem namespace. Thus, method 400 proceeds to an act 406 of, when the operation is an enumeration of a directory in both the mutable layer and an immutable layer, returning a merged directory object. In some embodiments, act 406 comprises, based at least the operation requesting to enumerate the directory, identifying a first directory data structure corresponding to the directory in the first filesystem namespace and comprising a first set of objects within the directory in the first filesystem namespace, and identifying a second directory data structure corresponding to the directory in the second filesystem namespace and comprising a second set of objects within the directory in the second filesystem namespace. Act 406 also comprises merging the first set of objects and the second set of objects into a third set of objects, where for each object that overlaps between the first set of objects and the second set of objects, the third set of objects comprises an instance of the object from the first set of objects; and returning the third set of objects. In an example, the operation identification component 203 identifies an operation to enumerate directory 309' on the scratch 302. The operation handling component 204 then obtains a first directory objects for directory 309 (a first set of objects, including object 310 and object 311) and a second directory object for directory 309' (a second set of objects, including object 310' and object 312), and merges the objects identified by those directory objects to produce and return a directory object for directory 309" (a third set of objects, including object 310', object 311, and object 312). An effect of act 406 includes presenting a merged view of a directory during an enumeration.

As mentioned, in embodiments, the union filesystem component 111 maintains (using the cache management component 207 and the tombstone generation component 206) a set of tombstones 115 indicating if an object has been deleted, and the operation handling component 204 utilizes these tombstones during enumerations. Thus, in some embodiments of method 400, act 406 also comprises suppressing a particular object from the third set of objects based on identifying a delete tombstone corresponding to the particular object within a cache stored in the system memory.

In some embodiments, an operation identified in act 403 is a delete operation, which results in creation of a delete tombstone for a target object. Thus, in some embodiments, method 400 also includes identifying an operation on the merged filesystem namespace that requests to delete a file exposed as being within the merged filesystem namespace and that is stored in the second filesystem namespace; and based at least the operation requesting to delete the file, adding a delete tombstone corresponding to the file to a cache stored in the system memory, the delete tombstone configured to suppress the file from being exposed as being within the merged filesystem namespace.

In some embodiments, an operation identified in act 403 is a rename operation, which results in creation of a rename tombstone for a target directory. Thus, in some embodiments, method 400 also includes identifying an operation on the merged filesystem namespace that requests to rename a directory exposed as being within the merged filesystem namespace and that is stored in the second filesystem namespace; and based at least the second operation requesting to rename the directory, adding a rename tombstone corresponding to the directory to a cache stored in the system memory, the rename tombstone storing a prior directory name.

In some embodiments, an operation identified in act 403 is a replace operation, which results in creation of a replace tombstone for a target directory. Thus, in some embodiments, method 400 also includes identifying an operation on the merged filesystem namespace that requests to replace a first directory exposed as being within the merged filesystem namespace and that is stored in the second filesystem namespace; and based at least the operation requesting to replace the directory, adding a replaced tombstone corresponding to the first directory to a cache stored in the system memory, the replaced tombstone configured to cause the merged filesystem namespace to include a second directory within the first filesystem namespace rather than the first directory.

Embodiments of the disclosure (e.g., computing environment 100) may comprise or utilize a special-purpose or general-purpose computer system that includes computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A computer-implemented method for providing a copy-on-write union filesystem, the computer-implemented method comprising:
   identifying a first filesystem namespace as a mutable layer;
   identifying a second filesystem namespace as an immutable layer;
   exposing a merged filesystem namespace as a union filesystem that merges the mutable layer and the immutable layer, the union filesystem overlaying the first filesystem namespace over the second filesystem namespace, wherein for each overlapping file that overlaps between the first filesystem namespace and the second filesystem namespace, the merged filesystem namespace comprises an instance of the file as stored in the first filesystem namespace;

identifying a first operation on the merged filesystem namespace that requests to read from a first file within the merged filesystem namespace;

determining that the first file is stored in the second filesystem namespace and is not stored in the first filesystem namespace; and based on determining that the first file is stored in the second filesystem namespace and is not stored in the first filesystem namespace, returning a first handle referencing a proxy object stored in a system memory, the proxy object including a mapping to a first file object corresponding to the first file as stored in the second filesystem namespace; and storing a second handle referencing the first file object within a path cache stored in the system memory, the second handle being associated, in the path cache, with a path to the first file.

2. The computer-implemented method of claim 1, further comprising:

identifying a second operation on the merged filesystem namespace that requests to write to a second file within the merged filesystem namespace, the second file being stored in the second filesystem namespace and not being stored in the first filesystem namespace;

storing a copy of the second file in the first filesystem namespace; and returning a third handle referencing a second file object corresponding to the copy of the second file as stored in the first filesystem namespace.

3. The computer-implemented method of claim 1, further comprising:

identifying a second operation on the merged filesystem namespace that requests to enumerate a directory within the merged filesystem namespace;

identifying a first directory data structure corresponding to the directory in the first filesystem namespace and comprising a first set of objects within the directory in the first filesystem namespace;

identifying a second directory data structure corresponding to the directory in the second filesystem namespace and comprising a second set of objects within the directory in the second filesystem namespace;

merging the first set of objects and the second set of objects into a third set of objects, wherein for each object that overlaps between the first set of objects and the second set of objects, the third set of objects comprises an instance of the object from the first set of objects; and returning the third set of objects.

4. The computer-implemented method of claim 3, further comprising suppressing a particular object from the third set of objects based on identifying a delete tombstone corresponding to the particular object within a cache stored in the system memory.

5. The computer-implemented method of claim 1, further comprising:

identifying a second operation on the merged filesystem namespace that requests to delete a second file exposed as being within the merged filesystem namespace and that is stored in the second filesystem namespace; and adding a delete tombstone corresponding to the second file to a cache stored in the system memory, the delete tombstone configured to suppress the second file from being exposed as being within the merged filesystem namespace.

6. The computer-implemented method of claim 1, further comprising:

identifying a second operation on the merged filesystem namespace that requests to rename a directory exposed as being within the merged filesystem namespace and that is stored in the second filesystem namespace; and adding a rename tombstone corresponding to the directory to a cache stored in the system memory, the rename tombstone storing a prior directory name.

7. The computer-implemented method of claim 1, further comprising:

identifying a second operation on the merged filesystem namespace that requests to replace a first directory exposed as being within the merged filesystem namespace and that is stored in the second filesystem namespace; and adding a replaced tombstone corresponding to the first directory to a cache stored in the system memory, the replaced tombstone configured to cause the merged filesystem namespace to include a second directory within the first filesystem namespace rather than the first directory.

8. The computer-implemented method of claim 1, further comprising identifying a third filesystem namespace as an additional immutable layer, and wherein:

the union filesystem merges the mutable layer, the immutable layer, and the additional immutable layer; and the union filesystem overlays the first filesystem namespace over the second filesystem namespace, and overlays the second filesystem namespace over the third filesystem namespace, wherein for each file that overlaps between the second filesystem namespace and the third filesystem namespace and that does not exist in the first filesystem namespace, the merged filesystem namespace comprises an instance of the file as stored in the second filesystem namespace.

9. A computer system for providing a copy-on-write union filesystem, comprising:

a processor;

a memory; and a computer storage media that stores computer-executable instructions that are executable by the processor to cause the computer system to at least:

identify a first filesystem namespace as a mutable layer;

identify a second filesystem namespace as an immutable layer;

expose a merged filesystem namespace as a union filesystem that merges the mutable layer and the immutable layer, the union filesystem overlaying the first filesystem namespace over the second filesystem namespace, wherein for each file that overlaps between the first filesystem namespace and the second filesystem namespace, the merged filesystem namespace comprises an instance of the file as stored in the first filesystem namespace;

identify a first operation on the merged filesystem namespace that requests to read from a first file within the merged filesystem namespace;

determine that the first file is stored in the second filesystem namespace and is not stored in the first filesystem namespace; and based on determining that the first file is stored in the second filesystem namespace and is not stored in the first filesystem namespace,
- return a first handle referencing a proxy object stored in the memory, the proxy object including a mapping to a first file object corresponding to the first file as stored in the second filesystem namespace; and
- store a second handle referencing the first file object within a path cache stored in the memory, the second handle being associated, in the path cache, with a path to the first file.

10. The computer system of claim 9, the computer-executable instructions also including instructions that are executable by the processor to cause the computer system to at least:
- identify a second operation on the merged filesystem namespace that requests to write to a second file within the merged filesystem namespace, the second file being stored in the second filesystem namespace and not being stored in the first filesystem namespace;
- store a copy of the second file in the first filesystem namespace; and
- return a third handle referencing a second file object corresponding to the copy of the second file as stored in the first filesystem namespace.

11. The computer system of claim 9, the computer-executable instructions also including instructions that are executable by the processor to cause the computer system to at least:
- identify a second operation on the merged filesystem namespace that requests to enumerate a directory within the merged filesystem namespace;
- identify a first directory data structure corresponding to the directory in the first filesystem namespace and comprising a first set of objects within the directory in the first filesystem namespace;
- identify a second directory data structure corresponding to the directory in the second filesystem namespace and comprising a second set of objects within the directory in the second filesystem namespace;
- merge the first set of objects and the second set of objects into a third set of objects, wherein for each object that overlaps between the first set of objects and the second set of objects, the third set of objects comprises an instance of the object from the first set of objects; and
- return the third set of objects.

12. The computer system of claim 11, the computer-executable instructions also executable by the processor to cause the computer system to suppress a particular object from the third set of objects based on identifying a delete tombstone corresponding to the particular object within a cache stored in the memory.

13. The computer system of claim 9, the computer-executable instructions also including instructions that are executable by the processor to cause the computer system to at least:
- identify a second operation on the merged filesystem namespace that requests to delete a second file exposed as being within the merged filesystem namespace and that is stored in the second filesystem namespace; and
- add a delete tombstone corresponding to the second file to a cache stored in the memory, the delete tombstone configured to suppress the second file from being exposed as being within the merged filesystem namespace.

14. The computer system of claim 9, the computer-executable instructions also executable by the processor to cause the computer system to at least:
- identify a second operation on the merged filesystem namespace that requests to rename a directory exposed as being within the merged filesystem namespace and that is stored in the second filesystem namespace; and
- add a rename tombstone corresponding to the directory to a cache stored in the memory, the rename tombstone storing a prior directory name.

15. The computer system of claim 9, the computer-executable instructions also executable by the processor to cause the computer system to at least:
- identify a second operation on the merged filesystem namespace that requests to replace a first directory exposed as being within the merged filesystem namespace and that is stored in the second filesystem namespace; and
- add a replaced tombstone corresponding to the first directory to a cache stored in the memory, the replaced tombstone configured to cause the merged filesystem namespace to include a second directory within the first filesystem namespace rather than the first directory.

16. The computer system of claim 9, the computer-executable instructions also executable by the processor to cause the computer system to identify a third filesystem namespace as an additional immutable layer, and wherein:
- the union filesystem merges the mutable layer, the immutable layer, and the additional immutable layer; and
- the union filesystem overlays the first filesystem namespace over the second filesystem namespace, and overlays the second filesystem namespace over the third filesystem namespace, wherein for each file that overlaps between the second filesystem namespace and the third filesystem namespace and that does not exist in the first filesystem namespace, the merged filesystem namespace comprises an instance of the file as stored in the second filesystem namespace.

17. A computer program product comprising a computer storage media that stores computer-executable instructions that are executable by a processor to cause a computer system to provide a copy-on-write union filesystem, the computer-executable instructions including instructions that are executable by the processor to cause the computer system to at least:
- identify a first filesystem namespace as a mutable layer;
- identify a second filesystem namespace as an immutable layer;
- expose a merged filesystem namespace as a union filesystem that merges the mutable layer and the immutable layer, the union filesystem overlaying the first filesystem namespace over the second filesystem namespace, wherein for each file that overlaps between the first filesystem namespace and the second filesystem namespace, the merged filesystem namespace comprises an instance of the file as stored in the first filesystem namespace;
- identify a first operation on the merged filesystem namespace that requests to read from a first file within the merged filesystem namespace;
- determine that the first file is stored in the second filesystem namespace and is not stored in the first filesystem namespace; and
- based on determining that the first file is stored in the second filesystem namespace and is not stored in the first filesystem namespace, return a first handle referencing a proxy object stored in a memory of the computer system, the proxy object including a mapping to a first file object corresponding to the first file as stored in the second filesystem namespace; and store a second handle referencing the first file object within a path cache stored in the system memory, the second handle being associated, in the path cache, with a path to the first file.

18. The computer program product of claim 17, the computer-executable instructions also executable by the processor to cause the computer system to at least:

based on identifying a second operation on the merged filesystem namespace that requests to write to a second file within the merged filesystem namespace, the second file being stored in the second filesystem namespace and not being stored in the first filesystem namespace:

store a copy of the second file in the first filesystem namespace, and return a third handle referencing a second file object corresponding to the copy of the second file as stored in the first filesystem namespace; and based on identifying a third operation on the merged filesystem namespace that requests to enumerate a directory within the merged filesystem namespace;

identify a first directory data structure corresponding to the directory in the first filesystem namespace and comprising a first set of objects within the directory in the first filesystem namespace, identify a second directory data structure corresponding to the directory in the second filesystem namespace and comprising a second set of objects within the directory in the second filesystem namespace, merge the first set of objects and the second set of objects into a third set of objects, wherein for each object that overlaps between the first set of objects and the second set of objects, the third set of objects comprises the object from the first set of objects, and return the third set of objects.

19. The computer program product of claim 17, the computer-executable instructions also including instructions that are executable by the processor to cause the computer system to at least:

identify a second operation on the merged filesystem namespace that requests to delete a second file exposed as being within the merged filesystem namespace and that is stored in the second filesystem namespace; and add a delete tombstone corresponding to the second file to a cache stored in the memory, the delete tombstone configured to suppress the second file from being exposed as being within the merged filesystem namespace.

20. The computer program product of claim 17, the computer-executable instructions also executable by the processor to cause the computer system to at least:

identify a second operation on the merged filesystem namespace that requests to rename a directory exposed as being within the merged filesystem namespace and that is stored in the second filesystem namespace; and add a rename tombstone corresponding to the directory to a cache stored in the memory, the rename tombstone storing a prior directory name.

* * * * *